(12) United States Patent
Schiffman

(10) Patent No.: US 8,861,194 B2
(45) Date of Patent: Oct. 14, 2014

(54) PORTABLE ELECTRONIC DEVICE PROTECTION SYSTEM

(75) Inventor: Michael Schiffman, Boca Raton, FL (US)

(73) Assignee: Nash Martin Holdings, LLC, Boca Raton, FL (US)

( * ) Notice: Subject to any disclaimer, the term of this patent is extended or adjusted under 35 U.S.C. 154(b) by 14 days.

(21) Appl. No.: 13/521,567

(22) PCT Filed: Jan. 11, 2011

(86) PCT No.: PCT/US2011/020851
§ 371 (c)(1),
(2), (4) Date: Jul. 11, 2012

(87) PCT Pub. No.: WO2011/085378
PCT Pub. Date: Jul. 14, 2011

(65) Prior Publication Data
US 2012/0285849 A1    Nov. 15, 2012

Related U.S. Application Data

(60) Provisional application No. 61/293,963, filed on Jan. 11, 2010, provisional application No. 61/293,954, filed on Jan. 11, 2010.

(51) Int. Cl.
| | | |
|---|---|---|
| *G06F 1/16* | (2006.01) | |
| *A45C 13/00* | (2006.01) | |
| *H04B 1/38* | (2006.01) | |
| *A45C 11/22* | (2006.01) | |

(52) U.S. Cl.
CPC ............ *H04B 1/3888* (2013.01); *A45C 13/008* (2013.01); *A45C 13/002* (2013.01); *A45C 11/22* (2013.01)
USPC ...................................... 361/679.39; 361/809

(58) Field of Classification Search
USPC ............... 361/679, 679.01, 679.45, 724–727, 361/679.39, 809; 174/1–11 R, 12 R, 174/480–507, 50–51, 53–67, 650–669, 174/68.1–68.3, 95–101.5, 135–212; 383/108
See application file for complete search history.

(56) References Cited

U.S. PATENT DOCUMENTS 5,549,375 A * 8/1996 Pagliaccio ................. 312/319.1
5,944,173 A    8/1999 Boire et al.
(Continued)

FOREIGN PATENT DOCUMENTS

| JP | 09108024 | 4/1997 |
|---|---|---|
| KR | 100831090 | 5/2008 |
| WO | 2009050602 | 4/2009 |

OTHER PUBLICATIONS

International Search Report and Written Opinion for International Application No. PCT/US2011/020845 dated Nov. 21, 2011.

(Continued)

*Primary Examiner* — Hung Ngo
(74) *Attorney, Agent, or Firm* — Fleit Gibbons Gutman Bongini & Bianco PL; Jon A. Gibbons

(57) ABSTRACT

A system for protecting portable electronic devices within a disposable protective enclosure is disclosed. The system includes a housing, one or more processors, and a power source. A display is communicatively coupled to the one or more processors. One or more user interfaces are communicatively coupled to the one or more processors. A device encapsulator is communicatively coupled to the one or more processors. The device encapsulator includes a receiving area that is configured to receive at least one portable electronic device and a reactive disposable enclosure material. The device encapsulator further includes at least a first forming element disposed above the receiving area and at least a second forming element disposed below the first forming element. The first and second forming elements are configured to apply a stimulus to the reactive disposable enclosure material. At least one of the first and second forming elements transitions from a first position to a second position as the receiving portion transitions into and out of the housing.

15 Claims, 13 Drawing Sheets

(56) References Cited

U.S. PATENT DOCUMENTS

| | | |
|---|---|---|
| 6,137,685 A | 10/2000 | Morinaga |
| 6,178,086 B1* | 1/2001 | Sim et al. .................. 361/679.59 |
| 6,321,980 B1* | 11/2001 | Yazumi et al. ................ 235/379 |
| 7,324,349 B2* | 1/2008 | Wobig et al. .................. 361/756 |
| 2001/0026650 A1* | 10/2001 | Denko ............................ 383/60 |
| 2002/0012480 A1* | 1/2002 | Konno .......................... 383/111 |
| 2005/0213293 A1* | 9/2005 | Chen ............................. 361/683 |
| 2005/0279661 A1 | 12/2005 | Hodges |
| 2007/0087725 A1 | 4/2007 | Anderson |
| 2007/0215663 A1 | 9/2007 | Chongson et al. |
| 2009/0268992 A1* | 10/2009 | Brouwer ......................... 383/63 |
| 2010/0246111 A1* | 9/2010 | Yokota et al. ............. 361/679.01 |
| 2010/0310194 A1* | 12/2010 | Archambault .................. 383/42 |
| 2012/0285587 A1* | 11/2012 | Schiffman .................... 150/154 |

OTHER PUBLICATIONS

International Search Report and Written Opinion for International Application No. PCT/US2011/020851 dated Sep. 29, 2011.

* cited by examiner

PORTABLE ELECTRONIC DEVICE PROTECTION SYSTEM

CROSS-REFERENCE TO RELATED APPLICATIONS

This application is based upon and claims priority from U.S. Provisional Patent Application No. 61/293,963, filed on Jan. 11, 2010 and U.S. Provisional Patent Application No. 61/293,954, filed on Jan. 11, 2010, the entire disclosure of each individual aforementioned application is herein incorporated by reference in their entirety

FIELD OF THE INVENTION

The present invention generally relates to portable systems for forming plastic cases/pouches, and more particularly relates to a portable system that forms portable disposable plastic cases/pouches for portable electronic devices.

BACKGROUND OF THE INVENTION

Portable electronic devices have become increasingly popular over the past years. Individuals usually carry one or more portable electronic devices, such as a cellular phone, smart phones, tablet computers, or an audio player, with them regardless of their location. Many individuals try to protect their devices by using a case/pouch. These cases/pouches can be expensive and cumbersome. Also, in some circumstances an individual may not want to bring their case/pouch with them or may not even have one altogether.

For example, an individual may be at a location such as a resort and may want to take their device to the pool, the beach, etc. If a user has a conventional case/pouch, these cases/pouches generally only protect a device from minor bumps/falls and not from water, sand, etc. If the user does not have a protective case/pouch then the user may have to buy a case/pouch at the resort, which can be expensive, or will have to risk his/her device becoming wet or encountering debris. Therefore, current solutions generally fail to adequately provide portable electronic devices with inexpensive protection from the elements.

SUMMARY OF THE INVENTION

In one embodiment, a system for protecting portable electronic devices within a disposable protective enclosure is disclosed. The system comprises a housing, one or more processors, and a power source. A display is communicatively coupled to the one or more processors. One or more user interfaces are communicatively coupled to the one or more processors. A device encapsulator is communicatively coupled to the one or more processors. The device encapsulator comprises a receiving area that is configured to receive at least one portable electronic device and a reactive disposable enclosure material. The device encapsulator further comprises at least a first forming element disposed above the receiving area and at least a second forming element disposed below the first forming element. The first and second forming elements are configured to apply a stimulus to the reactive disposable enclosure material. At least one of the first and second forming elements transitions from a first position to a second position as the receiving portion transitions into and out of the housing.

In yet another embodiment, a system for protecting portable electronic devices within a disposable protective enclosure is disclosed. The system comprises a housing, one or more processors, a power source, and a display communicatively coupled to the one or more processors. The system also comprises one or more user interfaces that are communicatively coupled to the one or more processors and a device encapsulator that is communicatively coupled to the one or more processors. The device encapsulator comprises a receiving portion configured to receive at least one portable electronic device and a reactive disposable enclosure material. The receiving portion is configured to transition in and out of the housing and any position therebetween. One or more lower forming elements disposed within a recessed area of the receiving portion. The one or more lower forming elements comprise a first extending member that extends outward from a first side portion of the one or more lower forming elements and a second extending member that extends outward from a second side portion of the one or more lower forming elements situated opposite from the first side portion. One or more upper forming elements are disposed between a first elongated vertical member and a second elongated member disposed outside of the receiving portion. The one or more upper forming elements comprise a third extending member that extends outward from a first side portion of the one or more upper forming elements and a fourth extending member extending outward from a second side portion of the one or more upper forming elements situated opposite from the first side portion of the one or more upper forming elements. Each of the first and second elongated vertical members comprises a first slotted area configured to receive the first and second extending members, respectively, and a second slotted area configured to receive the third and fourth extending members, respectively, as the receiving portion transitions into the housing. The first slotted area comprises a first end that is lower than a second end situated opposite from the first end. The second slotted area comprises a first end that is higher than a second end situated opposite from the first end. The receiving portion further comprises a first vertical member extending from a top surface of a first side region of the receiving portion, and a second vertical member extending from a top surface of a second side region of the receiving portion situated opposite from the first side region. Each of the first and second vertical members is configured move the one or more upper forming elements within the second slotted area as the receiving portion is transitioned into the housing.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The various embodiments of the presently claimed invention are advantageous because portable electronic devices are protected using a disposable protective enclosure. In one embodiment a portable protection system is disclosed that encapsulates a portable electronic device within the disposable protective enclosure.

General Overview

Figure 1:
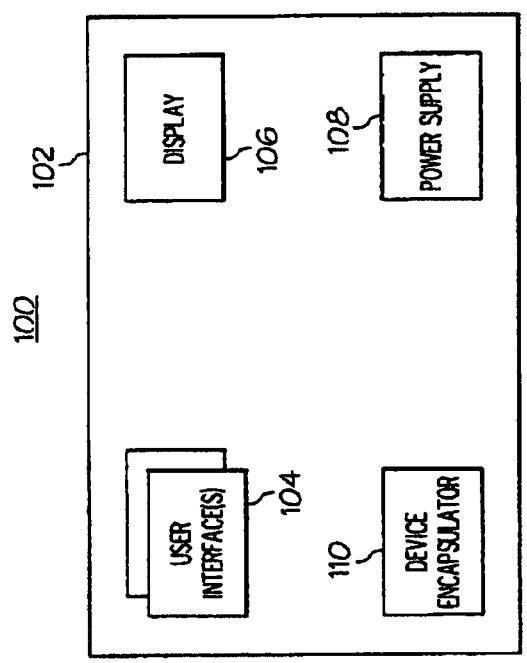
FIG. 1 is a block diagram of a system for protecting a portable electronic device within a disposable enclosure according to one embodiment of the present invention.

According to one embodiment, FIG. 1 illustrates a system 100 that protects portable electronic devices within an enclosure. For example, the system/device 100 protects portable electronic devices by encapsulating a device in a disposable/temporary cover/pouch that resists elements such as water, wind, UVA/UVB rays, dirt, sand, snow, and the like. In one embodiment, the system 100 is portable and comprises its own power source such as batteries and/or can be plugged into a power source. The system 100, in one embodiment, substantially forms the disposable cover/pouch to the geometry of the portable electronic device. In other embodiments, the system 100 can substantially form portions of the disposable cover/pouch to one or more portions of the device while leaving other portions of the disposable cover/pouch in a less contoured configuration.

The system 100, in one embodiment, includes a housing 102. The housing 102 can be made of any materials or combination of materials. For example, the housing 102 can comprise of plastics, polymers, metals, alloys, wood, and/or the like. The system 100 also includes one or more user interfaces 104. The user interface(s) 104, in one embodiment, allows a user to operate the system 100. For example, the user interface(s) 104 can be a button/switch that allows the user to turn on the system 100, select various parameters for operating the system 100, initiate an encapsulation process, and the like.

The system 100 also includes a display 106 such as (but not limited to) a liquid crystal display, light emitting diode display, or the like. The display 106 provides various information sets to the user. For example, the display 106 can show system status, various menus, parameter information, power information, and the like. The system 100 also includes a power supply 108 that provides power to the system 100. The power supply 108 can be a portable power supply such as a battery or a fixed power supply that requires an outlet. A device encapsulator 110 encapsulates a portable electronic device in a disposable cover/pouch. For example, the device encapsulator 110 receives a device and substantially conforms at least one portion of a disposable cover/pouch to at least one portion of the device. The device is then full encapsulated within the disposable cover/pouch. When the user no longer requires the disposable cover/pouch the cover/pouch can easily be removed and discarded.

Figure 2:
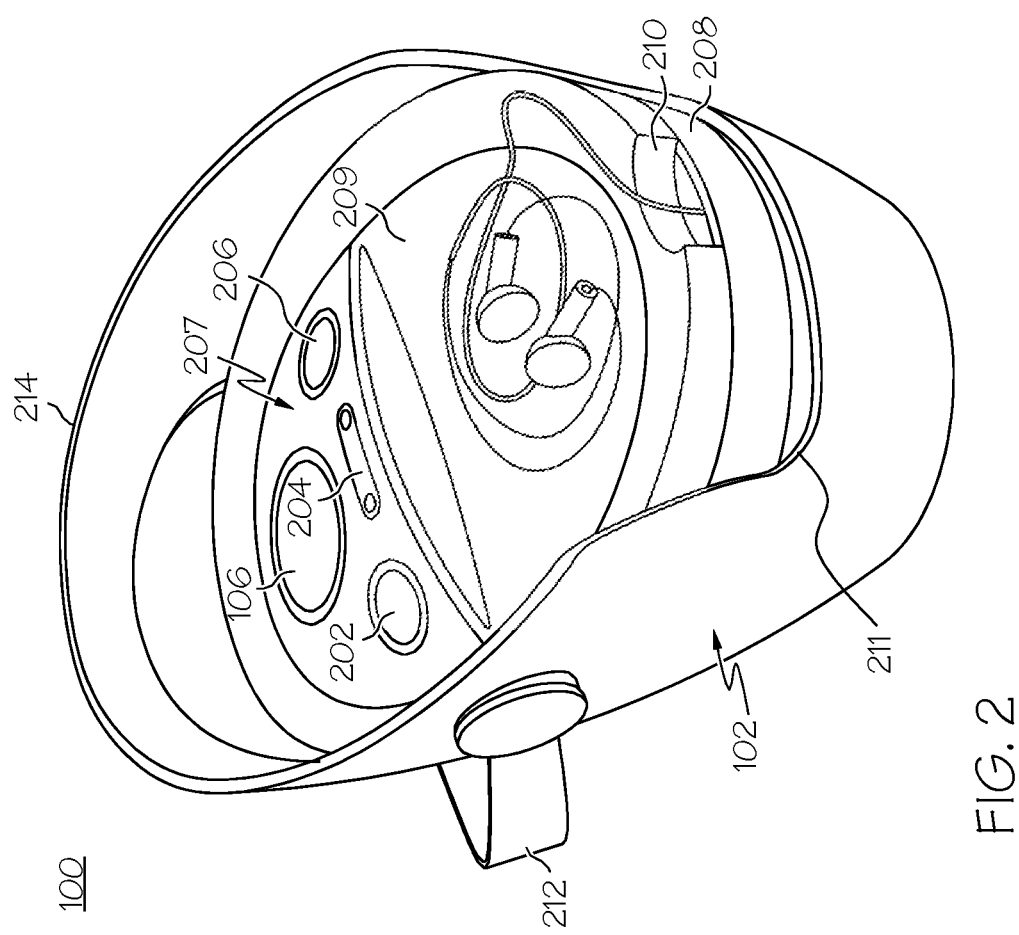
FIG. 2 illustrates a more detailed view of the system of FIG. 1 according to one embodiment of the present invention.

FIG. 2 shows a more detailed view of the system 100. It should be noted that FIG. 2 only shows one configuration of the system 100 and does not limit the present invention to such a configuration. Other configurations are also applicable to the various embodiments of the present invention as well. In particular, FIG. 2 shows the housing 102 comprising a plurality of user interfaces 202, 204, 206 disposed on a top portion 207 of a main body 209 of the housing 102. As discussed above, these user interfaces 202, 204, 206 allow the user to interact with the system. For example, one button 202 can be used to open/close a door 208 of the device encapsulator 110. Another button 204 can be used to change system parameters such as menu parameters, encapsulation process parameters, notification parameters, and the like. Yet another button 206 can be used to start/stop/pause the encapsulation process. FIG. 2 also shows the display 106 disposed on the housing 102 as well. In the example of FIG. 2, the display 106 is disposed on the top portion 207 of the main body 209 of the housing 102.

The system 100 also includes a portion 210 disposed above the device encapsulation door 208 on the top portion 207 of the main body 209 of the housing 102 that is configured to allow one or more wires to pass from within the device encapsulator 110 to the outside of the system 100. In one embodiment, this portion 210 is recessed inward from the door 208 as shown in FIG. 2. However, this is only one configuration and any configuration that allows one or more wires to pass from within the device encapsulator 110 to the outside of the system 100 are also applicable as well.

This feature is advantageous because a user may desire to have headphones, a microphone, a charger plug, and the like coupled to the portable electronic device while being protected by the disposable cover/pouch. Allowing the wires to extend from within the device encapsulator 110 to the outside of the system 100 allows for the wires to be positioned correctly during the encapsulation process. FIG. 2 also shows that one or more handles 212, 214 are coupled to the housing 102 for easy transport of the system 100. In one embodiment, one or more handles 212 are moveable and one or more handles 214 are molded into and are part of the housing 102. In the example of FIG. 2, one or more handles 214 that are molded extend above the top portion 207 of the main body 209 of the housing 102.

Figure 8:
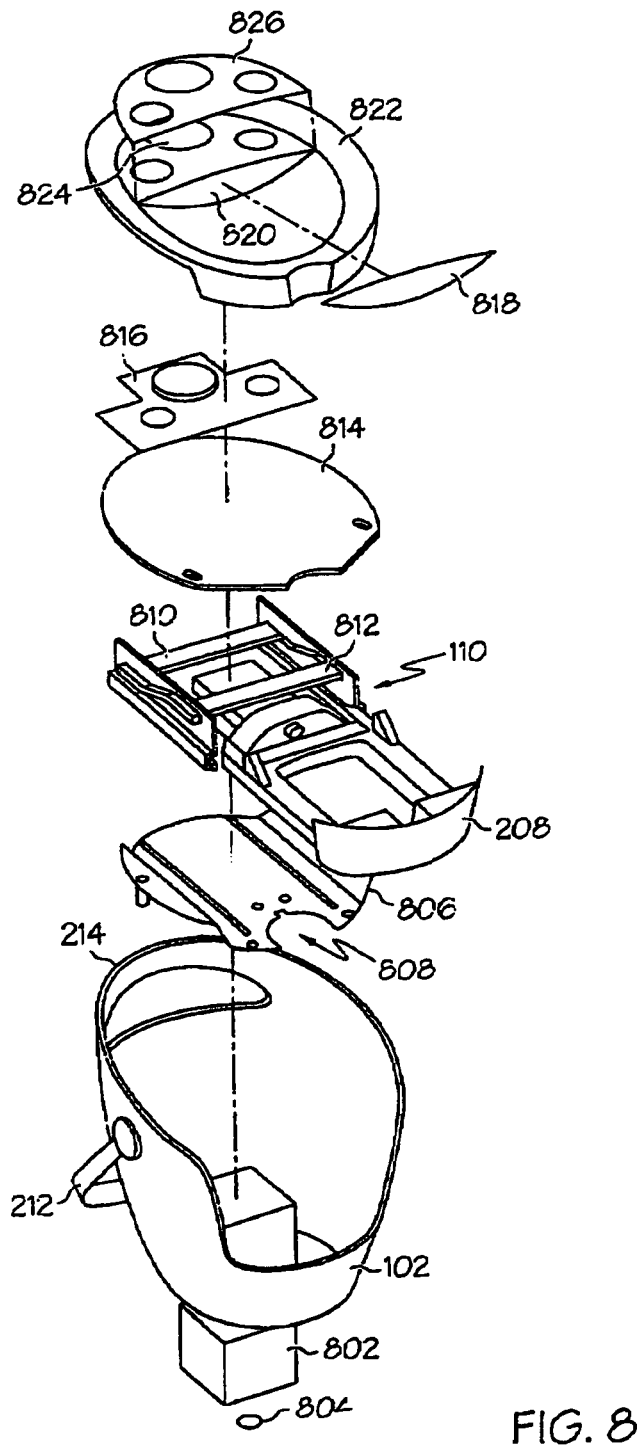
FIG. 8 is a side exploded view of the system of FIG. 1 according to one embodiment of the present invention.
Figure 9:
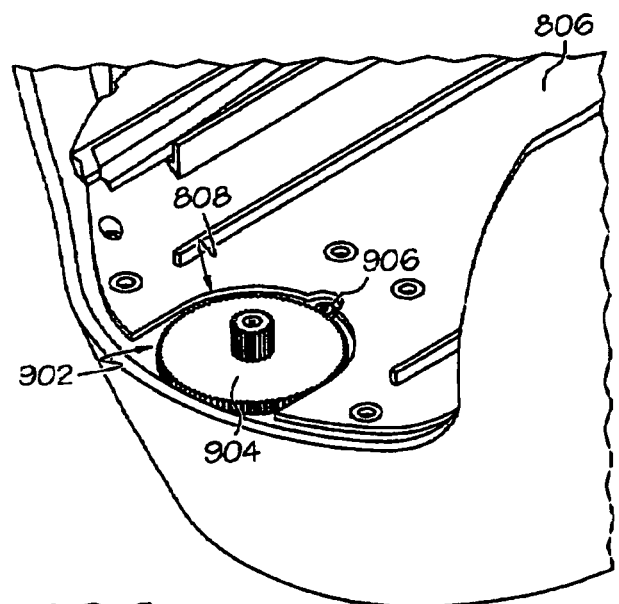
FIG. 9 shows a top side view of a bottom bracket and a drive mechanism of the system of FIG. 1 according to one embodiment of the present invention.
Figure 10:
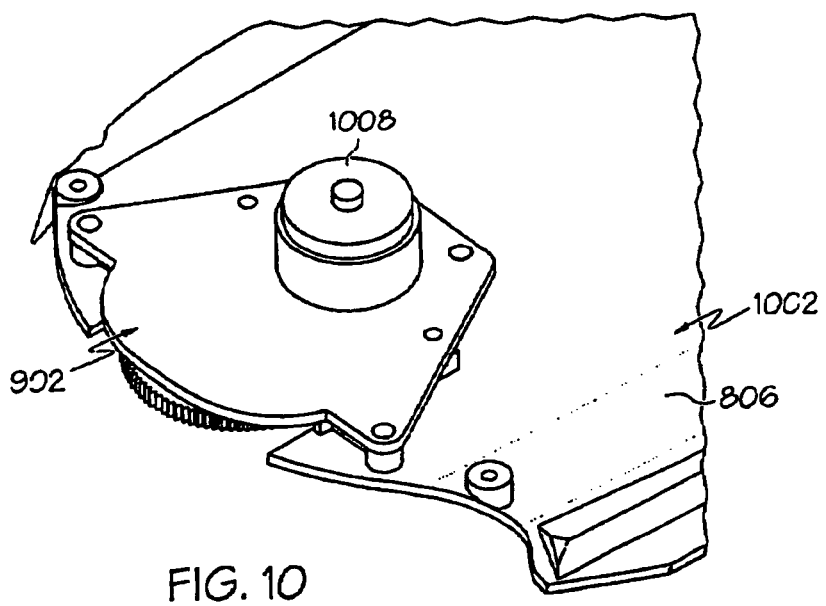
FIG. 10 shows a bottom side view of the bottom bracket and a drive mechanism of FIG. 9 according to one embodiment of the present invention.

FIG. 8 shows a side exploded view of the system 100. The example of FIG. 8 shows a power source 802 and retaining mechanism 804 for retaining the power source 802 within the housing 102. FIG. 8 also shows the housing 102 and the handles 212, 214. A bottom bracket 806 is shown that is disposed within the housing 102. In one embodiment, a drive mechanism 902 couples to the bottom bracket 806, as shown in FIGS. 9-10. In particular, FIG. 9 shows a top-side view of the bottom bracket 806 with the drive mechanism 902 coupled to the underside 1002 of the bottom bracket 806, as shown in FIG. 10. The bottom bracket 806 comprises a cut-out area 808 that exposes a combination gear 904 and a motor gear 906, which is coupled to a motor 1008, that rotates the combination gear 904. As the combination gear 904 is rotated the door 208 is opened or closed.

Returning now to FIG. 8, shown is the device encapsulator 110 that comprises the door 208, receiving area and its components discussed below with respect to FIGS. 3-4, and one or more forming elements 810, 812. In one embodiment, the device encapsulator 110 is disposed between the bottom bracket 806 and a top bracket 814. FIG. 8 also shows a printed circuit board assembly 816 for the display 106 and its components. An optional bezel 818 is shown that can be disposed on a recessed portion 820 of a top cover 822. The top cover 822 comprises cut-outs 824 for the display 106 and its elements. An additional optional bezel 826 can be disposed on the top cover 822 at a location corresponding to the display cut-outs 824.

Figure 3:
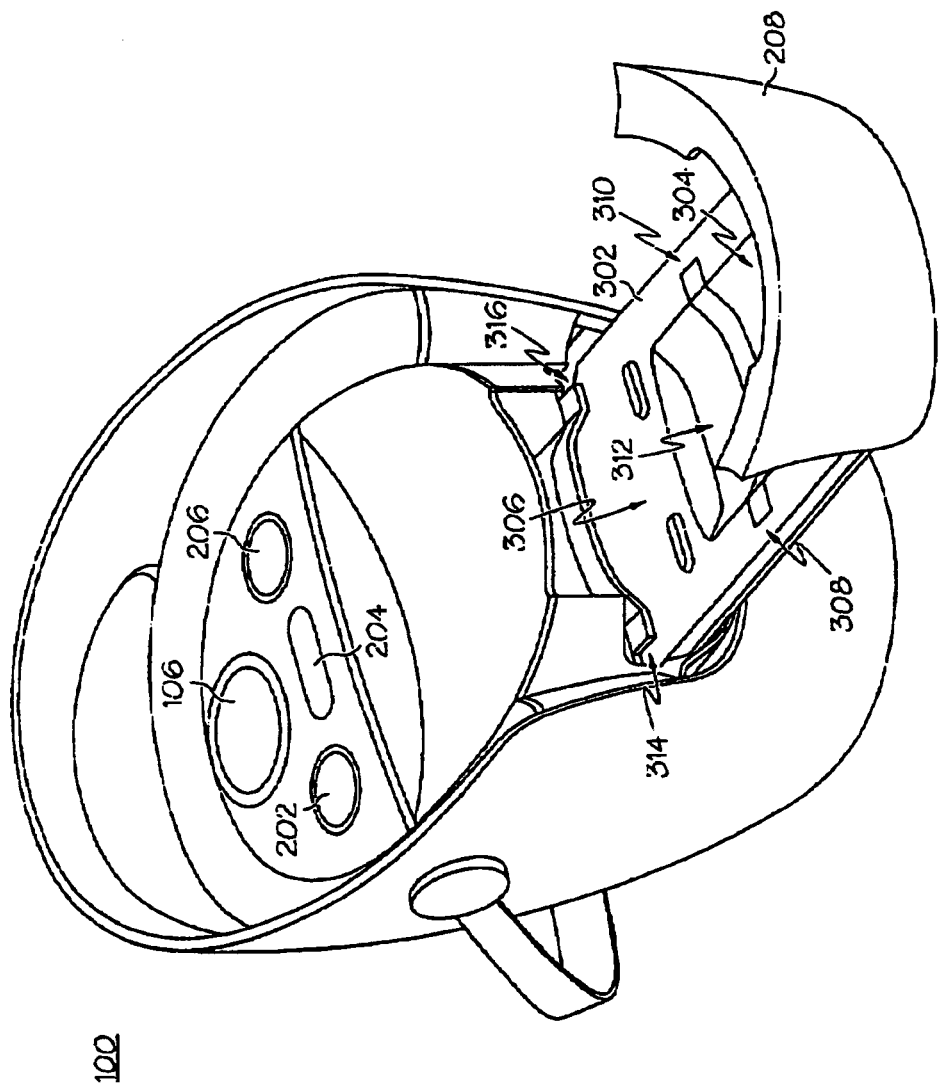
FIG. 3 illustrates a top side of a device encapsulator 110 of the system of FIG. 1 according to one embodiment of the present invention.
Figure 4:
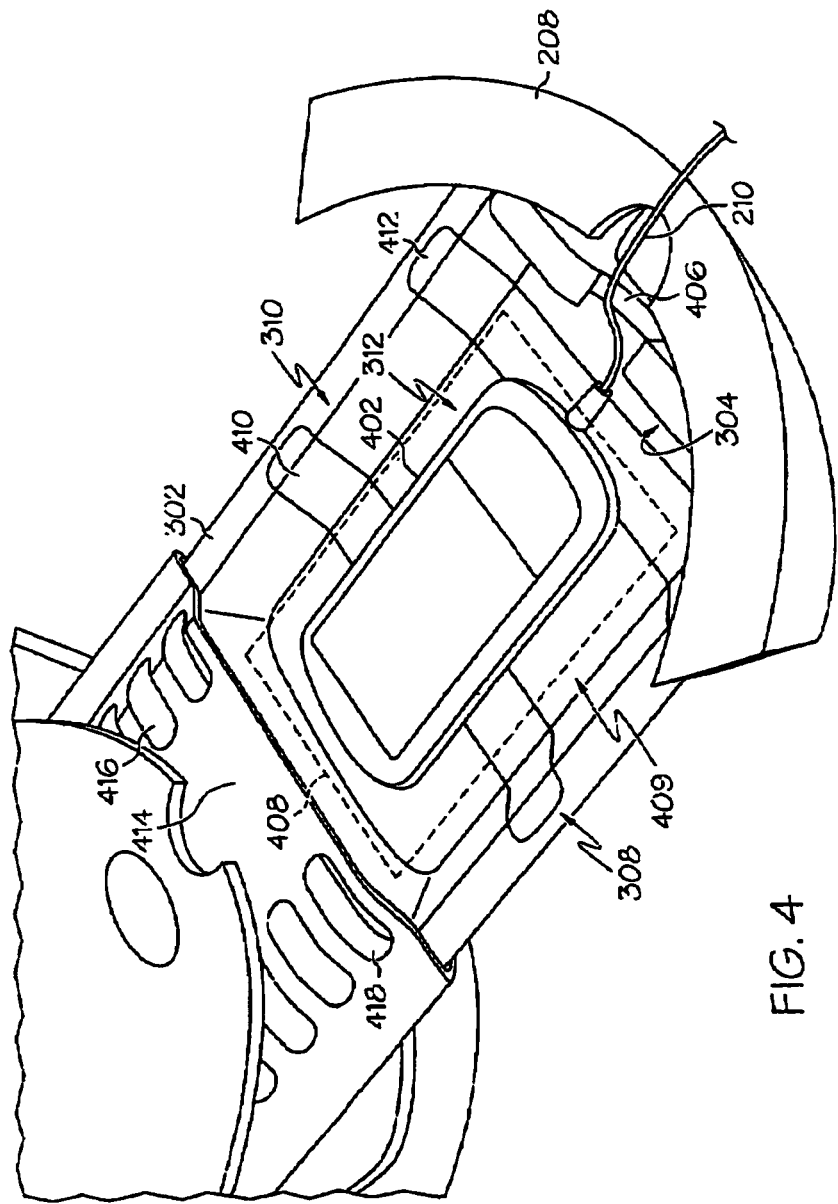
FIG. 4 illustrates a top side view of the device encapsulator 110 of FIG. 3 according to another embodiment of the present invention.

FIGS. 3 and 4 show an embodiment where the door 208 of the device encapsulator 110 is open. As discussed above, a user can depress/activate one of the user interfaces 202, 204, 206 to open/close the door 208. In another embodiment, the user can manually open the door 208. A receiving portion 302 is coupled to the door 208 and is configured to received and maintain a portable electronic device 402. For example, FIG. 4 shows a device residing within the receiving portion 302. In one embodiment, the receiving portion comprises a front end 304, a back end 306, and two side portions 308, 310 situated parallel and opposite to each other and substantially perpendicular to the front and back ends 304, 306. It should be noted that this configuration of the receiving portion 302 is only one example and other configurations are also applicable as well.

The receiving portion 302 comprises a recessed area 312 for retaining the portable electronic device 402. If the device 402 is coupled to one or more wires 404 such as headphones, charger wires, etc., these wires 404 are routed through one or more cut-out portions 406, 210. As discussed above, the cut-out portion 210 can be disposed on a portion of the housing 102 above the door 208. However, the cut-out portion 210 can also be disposed on the door 208 itself. The front end 304 of the receiving portion 302 can also include a cut-out portion 406 as well.

In one embodiment, the receiving portion 302 is configured to transition from a first position to a second position and any position in between. For example, the receiving portion 302 can include a transitioning mechanism such as rollers, bearings, etc. that allows the receiving portion 302 to transition inward such that the door 208 becomes flush with a front portion 211 of the housing 102 as shown in FIG. 2. However, the receiving portion 302 can also be transitioned outward such that the door 208 is not flush with the housing 102 as shown in FIGS. 3 and 4. This configuration allows a user to place a device 402 within the recessed area 312 and remove the device 402 from the recessed area 312. It should be noted that the receiving portion 302 is not required to include a transitioning mechanism. For example, inner areas 314, 316 of the device encapsulator 110 can include the transitioning mechanism that the receiving portion 302 transitions against. Also, the receiving portion 302 can also be maintained by one or more track-like elements of the inner areas 314, 316. In this embodiment, one or more portions of the receiving portion 302 "slide" on or between these "tracks" allowing the receiving portion 302 to transition in/out of the device encapsulator 110.

In one embodiment, the portable electronic device 402 is placed within a disposable protective cover/pouch 408 and then placed within the recessed area 312. The receiving portion 302 is then transitioned inward such that the door 208 is flush with at least a portion of the housing 102. The user is then able to initiate the device encapsulation process. In one embodiment, the device encapsulator 110 includes one or more forming elements that "shrink" and form the disposable protective cover/pouch 408 around the device 402. In another embodiment, the protective cover/pouch 408 remains "loose" around the device 402, but remains sealed around all the edges of the protective cover/pouch 408 to protect the device 402. Any type of forming element that produces a stimulus can be used. The stimulus can be a heat stimulus, a light stimulus, a vacuum stimulus, and/or the like. For example, FIG. 4 shows one or more forming elements 410, 412 disposed on a bottom portion 409 of the recessed area 312.

The device encapsulator 110 can also include one or more forming elements on an area 414 that is disposed above the recessed area. Therefore, the disposable protective cover/pouch 408 is heated from the top and bottom. Additional forming elements can be placed near the front and back portions 304, 306 of the receiving portion 302 as well to heat the disposable protective cover/pouch 408 from all sides. In one embodiment, only a portion of the disposable protective cover/pouch 408 is required to be heated to create a seal. However, all of the disposable protective cover/pouch 408 can be heated as well. One or more fans can also be utilized to evenly distribute the heat.

Figure 11:
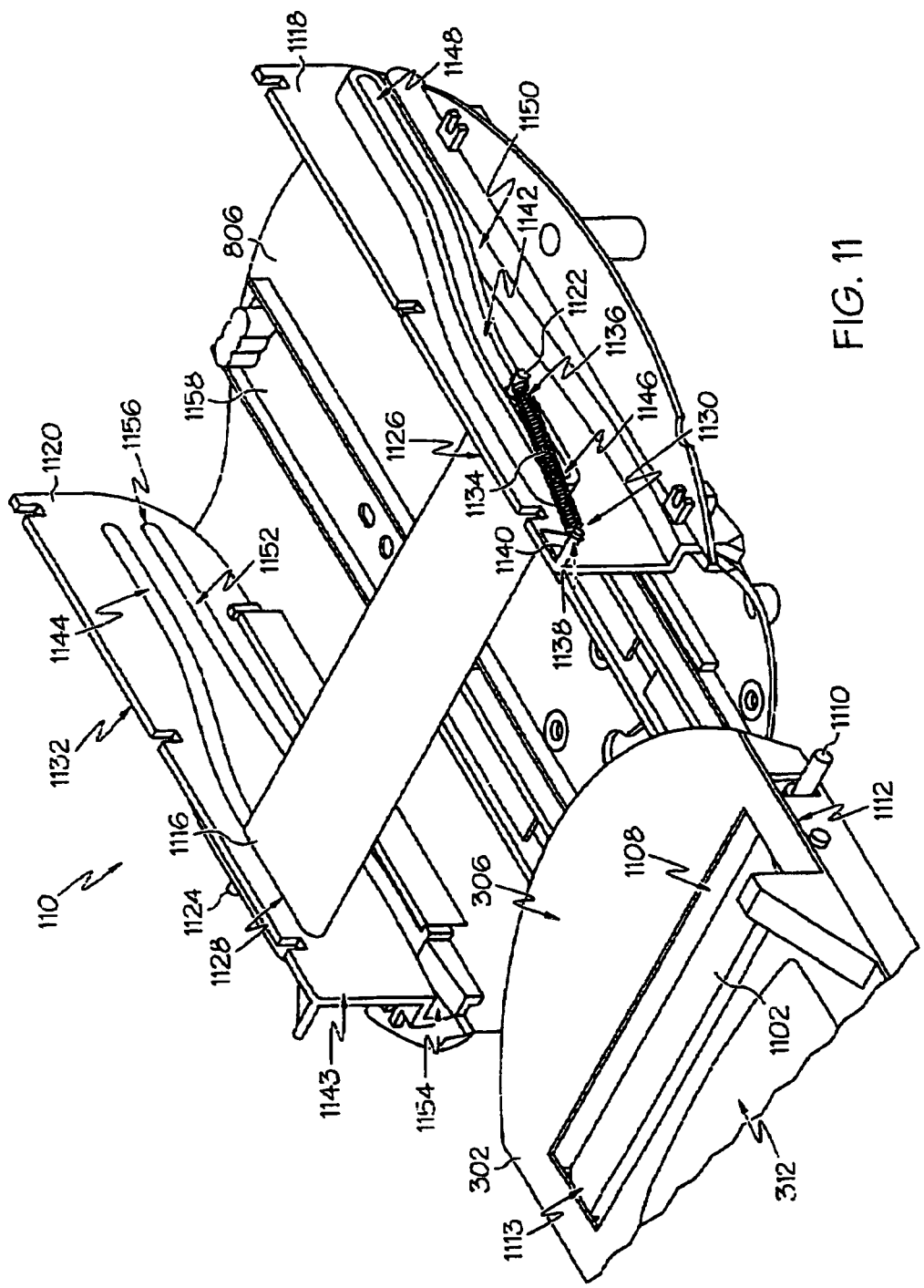
FIG. 11 shows a top side view of a device encapsulator of the system of FIG. 1 according to one embodiment of the present invention.

FIGS. 11-14 show another embodiment of the device encapsulator 110. In the example of FIG. 11, at least one lower forming element 1102 is disposed toward a back end 306 of the receiving portion 302. The lower forming element 1102 is disposed within another recessed area 1108 of the receiving portion 302 disposed behind the first recessed area 312. The lower forming element 1102 comprises a first extending member 1110 and a second extending member (not shown) that extend outward from a first side portion 1112 and a second portion 1113, respectively, of the lower forming element 1102 beyond a first side portion 308 and a second side portion 310 of the receiving portion 302, respectively.

FIG. 11 also shows at least one upper forming element 1116 that is disposed above the lower forming element 1102. In the example of FIG. 11, the upper forming element 1116 is disposed between a first elongated vertical member 1118 and a second elongated vertical member 1120 situated outside of the receiving portion 302. The first and second elongated members 1118, 1120 are coupled to the bottom bracket 806. The upper forming element 1116 comprises a first extending member 1122 and a second extending member 1124 that extend outward from a first side portion 1126 and a second portion 1128, respectively, of the upper forming element 1116 and beyond an outer surface 1130, 1132 of the first and second elongated vertical members 1118, 1120, respectively.

In one embodiment, each of the first and second upper forming element extending members 1122, 1124 are coupled to a resilient member 1134 such as, but not limited to, a spring. A first end 1136 of the resilient member 1134 is coupled to the extending member 1122. A second end 1138 of the resilient member 1134 is coupled to a protruding member 1140 of the elongated vertical member 1118, 1120.

The protruding member 1140 is disposed on an end 1143 of the elongated vertical member 1118, 1120 that is closest to the front portion 211 of the housing 102 and extends outward from the outer surface 1130, 1132 of the first and second elongated vertical members 1118, 1120. The first and second extending members 1122, 1124 of the upper forming element 1116 are disposed within a first slotted area 1142, 1144 of the elongated vertical members 1118, 1120. These slotted areas 1142, 1144 comprise a first end 1146 disposed towards the front portion 211 of the housing 102 that is elevated with respect to a second end 1148 that is situated opposite the first end 1146.

Each of the first and second elongated vertical members 1118, 1120 also comprises a second slotted area 1150, 1152 disposed below the first slotted area 1142, 1144 configured to receive the extending member 1110 (with a corresponding extending member on the far side below 1113 not shown) of the lower forming element 1102. These slotted areas 1150, 1152 comprise a first end 1154 disposed towards the front portion 211 of the housing 102 that is disposed lower than a second end 1156 situated opposite the first end 1154. As the door 208 closes the receiving portion 302 slides along one or more tracks 1158 disposed on the bottom bracket 806 and the extending member 1110 of the lower forming element 1102 enter the second slotted area 1150, 1152 of the elongated vertical members 1118, 1120, as shown in FIG. 12.

Figure 12:
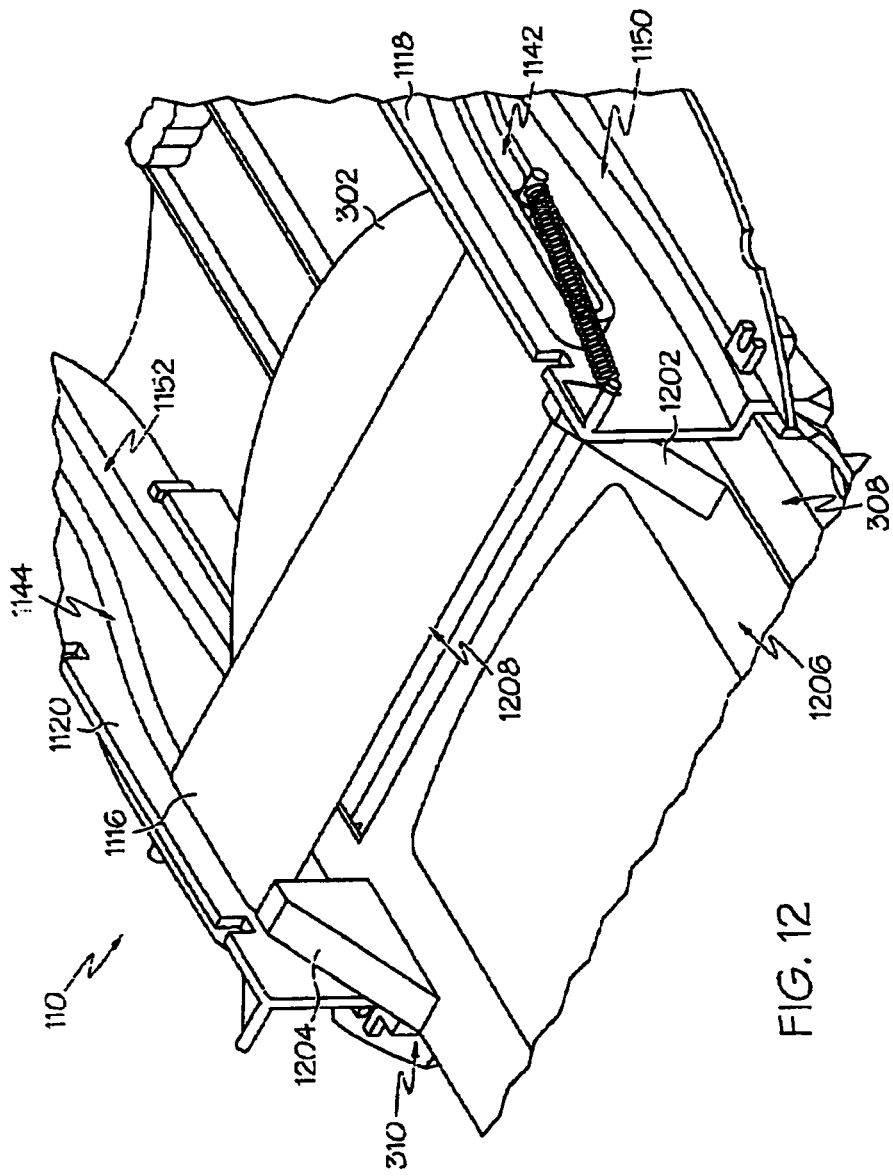
FIG. 12 shows a top side view of a device encapsulator of the system of FIG. 1 according to another embodiment of the present invention.

FIG. 12 also shows that a first and second vertical member 1202, 1204 are disposed on a top surface 1206 of the first and second side portions 308, 310 of the receiving portion 302, respectively. As the door 208 is closed these vertical members 1202, 1204 abut at least a front portion 1208 of the upper forming element 1116. As the door 208 continues to close and the receiving portion 302 moves into the housing 102 these vertical members 1202, 1204 move the upper forming element 116 within the first slotted area 1142, 1144.

As can be seen, the upper and lower forming elements 1116, 1102 travel with the receiving portion 302 as the receiving portion 302 moves into the housing 102. The resilient member 1134 returns the upper forming element 1116 back to the first end 1146 of the first slotted area 1142, 1144 as the door 208 is opened and the receiving portion 302 is transitioned out of the housing 102.

Figure 13:
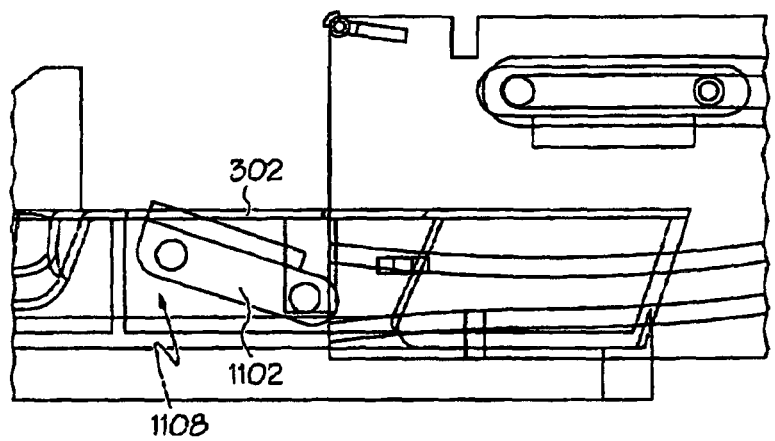
FIGS. 13-15 are cross-sectional side views of the device encapsulator of FIG. 11 illustrating how forming elements are configured to move within the device encapsulator according to one embodiment of the present invention.
Figure 14:
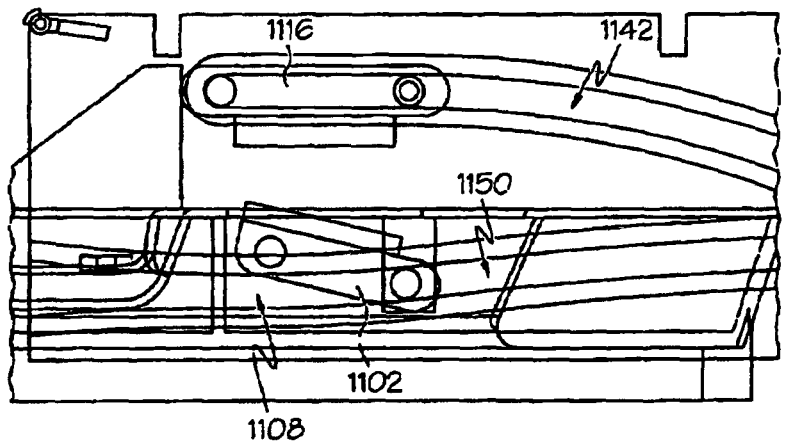
Figure 15:
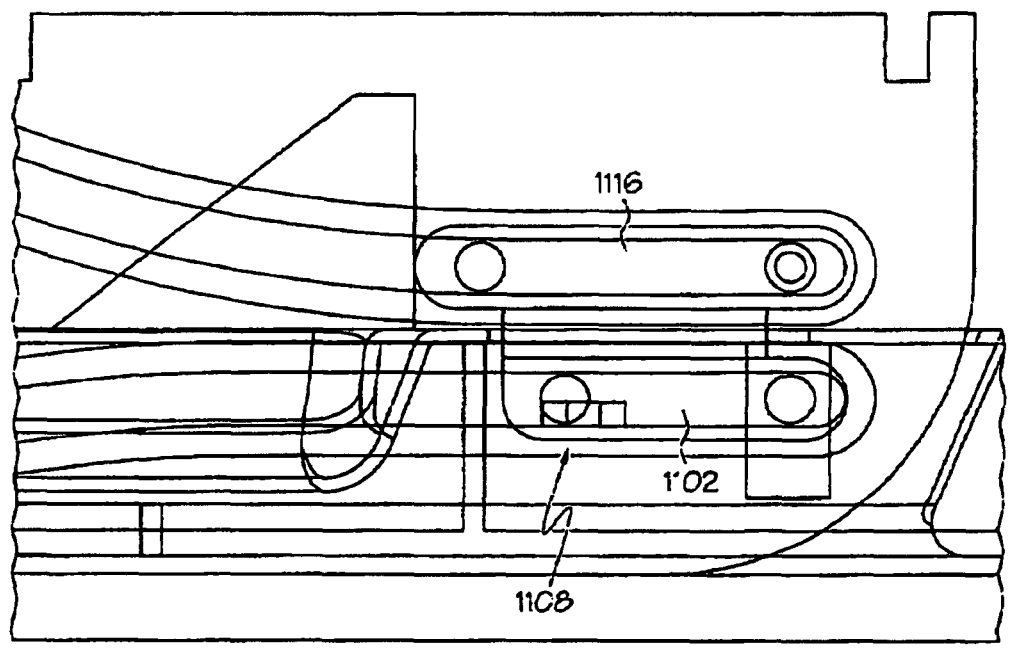

In one embodiment, the lower forming element 1102 is disposed within the second recessed area 1108 of the receiving portion 302 at an angle, as shown in FIG. 13. However, because the second slotted 1150, 1152 area becomes elevated as the receiving area 1106 travels inward into the housing 102 the lower forming element 1102 transitions from an angular position to a substantially flat or parallel position, as shown in FIGS. 14-15. Also, because the first slotted area 1142, 1144 decreases in elevation as the receiving area 1106 travels inward into the housing 102, the upper forming element 1116 is transitioned closer to the lower forming element 1102 as the door is closed, as shown in FIGS. 14-15. Therefore, the forming elements 1102, 1116 are correctly positioned over the reactive material surrounding a portable electronic device to create a protective cover/pouch 408 when the door 208 is closed.

It should be noted that one or more embodiments of present invention are not limited to using heat to form the disposable protective cover/pouch 408 around a device 402. For example, a disposable protective cover/pouch 408 can be utilized that responds to ultra-violet rays. In this embodiment, the device encapsulator 110 includes one or more ultraviolet-ray generators to form the disposable protective cover/pouch 408 to the device 402. In one embodiment, the device encapsulator 110 includes one or more vented areas 416, 418 that allow excess heat to escape. Also, the disposable protective cover/pouch 408 can also be made from a "breathable" material that lets excess heat escape from within the disposable protective cover/pouch 408.

Figure 5:
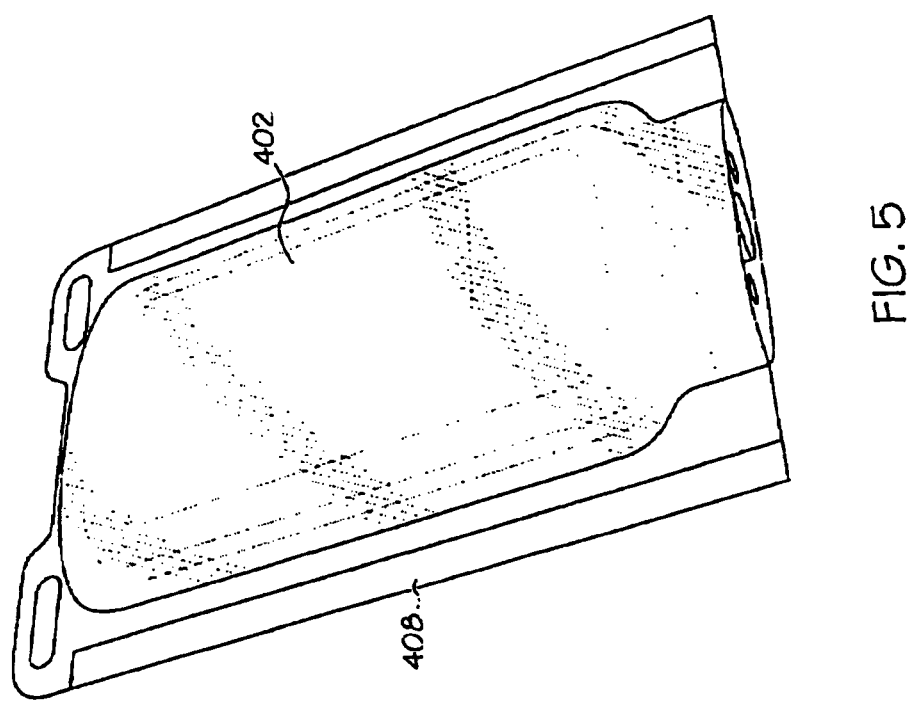
FIG. 5 illustrates a portable electronic device encapsulated in a disposable enclosure according to one embodiment of the present invention.

After the encapsulation process is completed. The portable electronic device 402 is protected within a disposable protective cover/pouch 408 as shown in FIG. 5. As can be seen from FIG. 5 the disposable protective cover/pouch 408 has been formed to the contours of the device 402. The disposable protective cover/pouch 408 has various features such as cutouts for lanyards, an access area for wires, and the like. The disposable protective cover/pouch 408 is discussed in greater detail in U.S. patent application Ser. No. 13/521,547, entitled "DISPOSABLE PROTECTION ENCLOSURE FOR PORTABLE ELECTRONIC DEVICES", by inventor Michael Schiffman" filed on Jul. 11, 2012, which is hereby incorporated by reference in its entirety.

Figure 6:
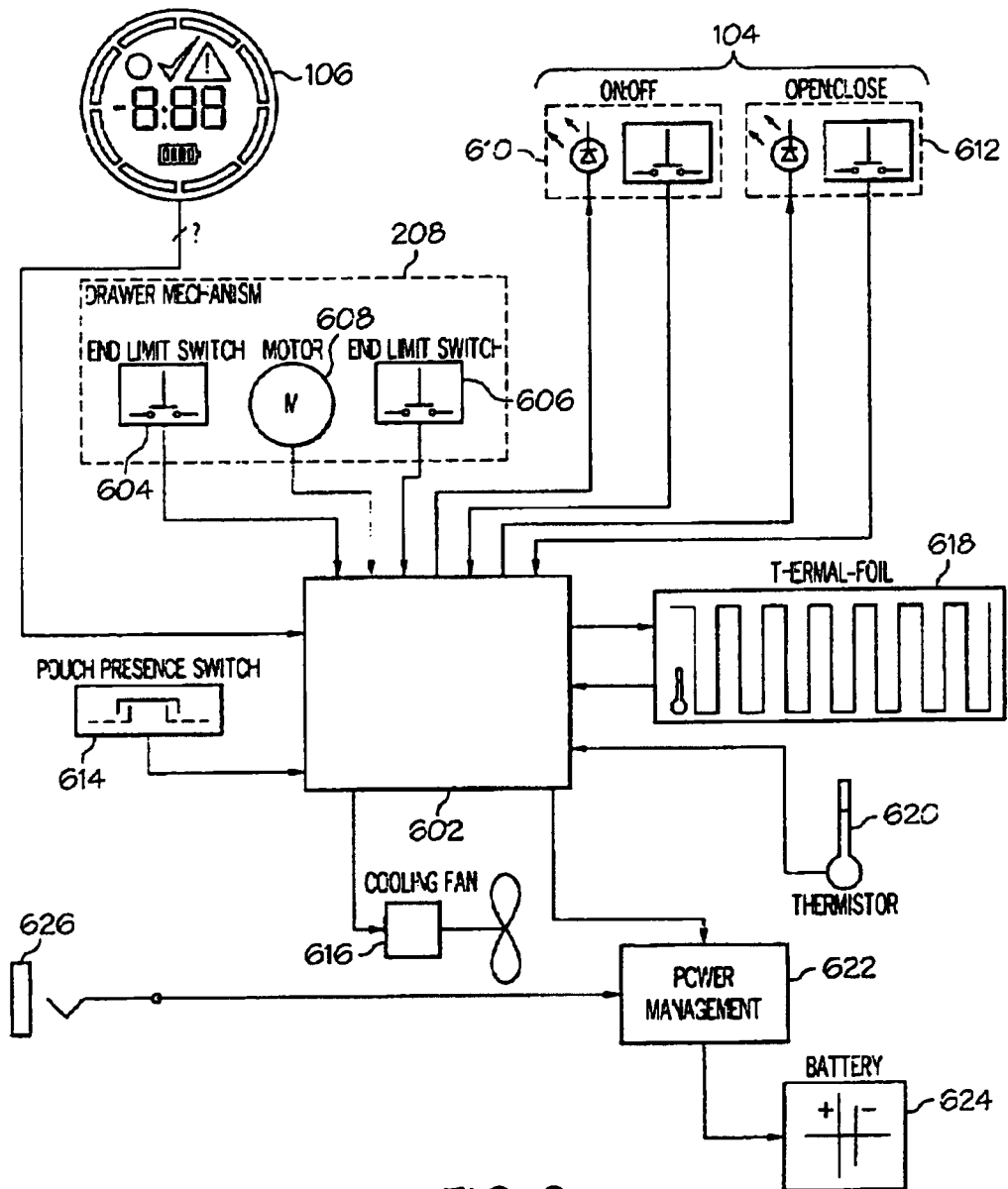
FIG. 6 is a schematic illustrating various components of the system of FIG. 1 according to one embodiment of the present invention.

FIG. 6 shows a high level circuit diagram 600 of the system 100. In particular, FIG. 6 shows a display 106 electrically coupled to one or more processors 602. A drawer/door mechanism 208 comprises one or more end limit switches 604, 606 and a motor 608 that is electrically coupled to the processor 602. One or more user interfaces 104, such as an on/off switch 610 and an open/close switch 612, are also electrically coupled to the processor 602.

A protection device presence switch 614 is also electrically coupled to the processor 602. The protection device presence switch 614 detects when a device 402 is placed within the recessed area 312 with a pouch 408. This is a safety mechanism that prevents the system 100 from operating when a pouch 408 is not present. This protects the portable electronic device 402 and the system 100.

A cooling fan 616 is also electrically coupled to the processor 602 as well as one or more heating (or other type) elements 618 such as a thermo-foil. A thermistor 620 is also electrically coupled to the processor 602. The thermistor 620 allows that system 100 to monitor the operating temperatures so that the portable electronic device 402 is not damaged and so that proper encapsulation can occur. A power management module 622 is electrically coupled to the processor 602, a battery 624, and a power port 626.

Figure 7:
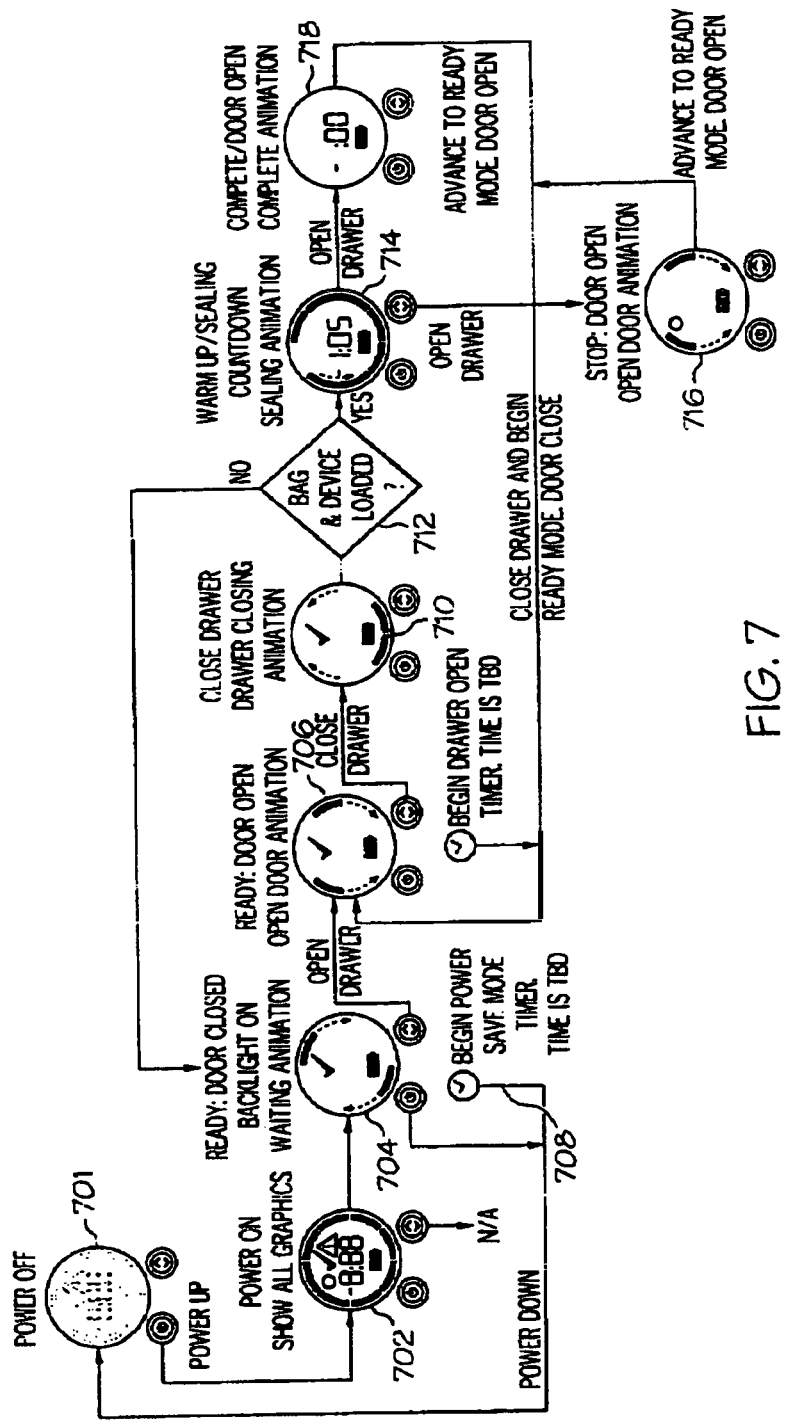
FIG. 7 is an operational flow diagram illustrating one process for operating the system of FIG. 1 according to one embodiment of the present invention.

FIG. 7 is an operational flow diagram illustrating an example of a process for operating the system 100. The operational flow diagram of FIG. 7 begins with the system 100 in an "off" state 701. A user, at step 702, powers on the system 100 and the system 100 displays all graphics during the start-up cycle. The system 100 then determines if the door is closed or open. If the door is closed the system 100, at step 704, displays a "door closed" graphic/animation on the display. If the door is open the system 100, at step 706 displays a "door open" graphic/animation on the display. The system, at step 708, also begins a power save mode timer that begins after a given interval of time has passed with no user input. When the time reaches a given threshold the system 100 can automatically power down.

If the system 100, at step 710, detects that the user has closed the door, the system displays a "closing drawer" graphic/animation. The system 100, at step 712, then determines if a device and pouch are detected within the receiving area. If this determination is negative, the control flows to step 704. If this determination is positive, the system 100, at step 714, begins the encapsulation process and displays a graphic/animation that indicates to the user that the encapsulation process has begun. In one embodiment, a count-down timer is also displayed to inform the user of the remaining time for the encapsulation process. A user is able to stop/pause this process and if the user selects to stop the process and open the door, the system 100, at step 716, informs the user that the process has been stopped and opens the door. When the encapsulation process has completed, the system 100, at step 718, informs the user that the process has completed and opens the door. It should be noted that the system 100 can also display other items on the display such as when the system is charging and various alerts.

As can be seen from the above, discussion, the various embodiments of the presently claimed invention are advantageous because portable electronic devices are protected using a disposable protective enclosure. The portable protection system encapsulates a portable electronic device within the disposable protective enclosure. The disposable protective enclosure protects portable electronic devices from various hazards such as water, snow, sand, dirt, debris, bumps/shocks, and the like.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A system for protecting portable electronic devices within a disposable protective enclosure, the system comprising:
 a housing;
 one or more processors;
 a power source;
 a display communicatively coupled to the one or more processors;
 one or more user interfaces communicatively coupled to the one or more processors; and
 a device encapsulator communicatively coupled to the one or more processors, the device encapsulator comprising a receiving area configured to receive at least one portable electronic device and a reactive disposable enclosure material, wherein the device encapsulator further comprises at least a first forming element disposed above the receiving area and at least a second forming element disposed below the first forming element, wherein the first and second forming elements are configured to apply at least one of a heat stimulus, a light stimulus, and a vacuum stimulus to shrink the reactive disposable enclosure material in size, and wherein at least one of the first and second forming elements transitions from a first position to a second position as a receiving portion transitions into and out of the housing.

2. The system of claim 1, wherein when the reactive disposable enclosure material reacts to the stimulus at least a portion of the reactive disposable enclosure material substantially conforms to at least a portion of the portable electronic device.

3. The system of claim 1, wherein the processor is configured to transition the receiving portion to one or more positions within the device encapsulator in response to receiving at least one signal from the one or more user interfaces.

4. The system of claim 1, wherein the second forming element is disposed at a location on the receiving portion that is below the portable electronic device when placed within the receiving portion.

5. The system of claim 1, further comprising:
 a sensing module configured to detect when the portable electronic device and the reactive disposable enclosure material are disposed within the receiving portion of the device encapsulator.

6. The system of claim 1, further comprising:
 a thermistor communicatively coupled to the processor, wherein the processor is configured to dynamically adjust an encapsulating process of the device encapsulator based on information received from the thermistor.

7. A system for protecting portable electronic devices within a disposable protective enclosure, the system comprising:
 a housing;
 one or more processors;
 a power source;
 a display communicatively coupled to the one or more processors;
 one or more user interfaces communicatively coupled to the one or more processors; and
 a device encapsulator communicatively coupled to the one or more processors, the device encapsulator comprising:
  a receiving portion configured to receive at least one portable electronic device and a reactive disposable enclosure material, the receiving portion being configured to transition in and out of the housing and any position therebetween;
  one more lower forming elements disposed within a recessed area of the receiving portion, the one or more lower forming elements comprising a first extending member extending outward from a first side portion of the one or more lower forming elements and a second extending member extending outward from a second side portion of the one or more lower forming elements situated opposite from the first side portion; and
  one or more upper forming elements disposed between a first elongated vertical member and a second elongated member disposed outside of the receiving portion, the one or more upper forming elements comprising a third extending member extending outward from a first side portion of the one or more upper forming elements and a fourth extending member extending outward from a second side portion of the one or more upper forming elements situated opposite from the first side portion of the one or more upper forming elements, wherein the lower forming elements and the upper forming elements are configured to apply at least one of a heat stimulus, a light stimulus, and a vacuum stimulus to shrink the reactive disposable enclosure material in size,
  wherein each of the first and second elongated vertical members comprises a first slotted area configured to receive a first and second extending members, respectively, and a second slotted area configured to receive the third and fourth extending members, respectively, as the receiving portion transitions into the housing,
  wherein the first slotted area comprises a first end that is lower than a second end situated opposite from the first end, and wherein the second slotted area comprises a first end that is higher than a second end situated opposite from the first end, and wherein the receiving portion further comprises a first vertical member extending from a top surface of a first side region of the receiving portion, and a second vertical member extending from a top surface of a second side region of the receiving portion situated opposite from the first side region, wherein each of the first and second vertical members are configured move the one or more upper forming elements within the second slotted area as the receiving portion is transitioned into the housing.

8. The system of claim 7, wherein each of the one or more lower forming elements and the one or more upper forming elements are configured to generate a stimulus to which the reactive disposable enclosure material reacts to, wherein when the reactive disposable enclosure material reacts to the stimulus at least a portion of the reactive disposable enclosure material substantially conforms to at least a portion of the portable electronic device.

9. The system of claim 7, further comprising:

a sensing module configured to detect when the portable electronic device and the reactive enclosure material are disposed within a receiving portion of the device encapsulator.

10. The system of claim 7, further comprising:

a thermistor communicatively coupled to the processor, wherein the processor is configured dynamically adjust an encapsulating process of the device encapsulator based on information received from the thermistor.

11. The system of claim 7, wherein the one or more lower forming elements transition from a substantially flat position when the receiving portion is within the housing to a substantially angular position as the receiving portion transitions out of the housing.

12. The system of claim 1, wherein the display indicates that an encapsulation process has begun to apply one of the at least one of a heat stimulus, a light stimulus, and a vacuum stimulus to shrink the reactive disposable enclosure material in size.

13. The system of claim 12, wherein the display includes a count-down timer indicating a remaining time for the encapsulation process.

14. The system of claim 7, wherein the display indicates that an encapsulation process has begun to apply one of the at least one of a heat stimulus, a light stimulus, and a vacuum stimulus to shrink the reactive disposable enclosure material in size.

15. The system of claim 14, wherein the display includes a count-down timer indicating a remaining time for the encapsulation process.

* * * * *